Patented Aug. 19, 1952

2,607,768

UNITED STATES PATENT OFFICE 2,607,768

ISOLATION OF PEA PROTEINS

Rolland M. McCready, Berkeley, and Vernon G. Silveira, Albany, Calif., assignors to the United States of America as represented by the Secretary of Agriculture No Drawing. Application April 21, 1950, Serial No. 157,416

4 Claims. (Cl. 260—123.5)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the isolation of colloidal substances, particularly proteinous substances. Thus the primary object of this invention is to provide methods for isolating colloidal substances, especially proteins. Another object of the invention is to provide methods for preparing protein concentrates useable as animal feeds from peas and other natural sources. Further objects and advantages of this invention will be obvious from the description herein.

The isolation of colloidal substances such as proteinous substances from their solutions presents many problems. In such isolations the first step is usually to apply some treatment to the solution to precipitate the protein. This treatment will vary widely depending on the nature of the protein in question. Thus in some cases, the treatment will consist in heating the solution. In other cases, the treatment will involve adjusting the pH to the isoelectric point of the protein. In still other cases the treatment will involve adding a precipitating agent such as an organic solvent (alcohol, acetone, isopropanol, propanol, etc.); a polyvalent metal salt (magnesium sulphate, lead acetate; a soluble alkali metal or ammonium salt (sodium chloride, ammonium sulphate, etc.); and so forth. Thus by way of example: The albumins are precipitated by heating their solutions or by adding a high concentration of a soluble salt (saturated ammonium sulfate, for example). Edestin is isolated from hemp seed by extracting fat-free hemp seed with 5% sodium chloride solution and then adjusting the pH of the extract to 6.9. The proteins may be isolated from horse serum by first precipitating the globulins with half-saturated ammonium sulphate and then adjusting the filtrate to pH 4.6–4.8 to precipitate the serum albumin. Gliadin is isolated from wheat flour by making a 70% alcohol extract and then adding lithium chloride to precipitate the gliadin. Many proteins can be precipitated by adjusting the pH of their solutions to the isoelectric point. The following table shows the optimum pH for precipitating certain proteins:

| Protein: | pH for optimum precipitation |
|---|---|
| Serum albumin | 5.4 |
| Serum globulin | 5.4 |
| Casein | 4.7 |
| Trypsin | 3.5 |
| Lysozyme | 9.5–11.0 |

The globulins are readily precipitated by low concentration of soluble salts, the following table illustrating the optimum salt concentrations required to precipitate horse serum globulin from a dilute aqueous solution:

| Salt: | Concentration |
|---|---|
| NaCl | 0.01–0.02 N |
| $Na_2SO_4$ | .0005–0.01 N |
| $BaCl_2$ | .001 N |

It is evident from the above that there are many different methods for precipitating protein and often a combination of treatments is used such as adjustment of pH, plus addition of a salting-out agent and so on. Regardless of the method which is used, in many cases the protein is precipitated in the form of very fine particles which remain in suspension in the liquid. This finely divided material is difficult to filter out of solution. The fine particles tend to clog the pores of the filter cloth or paper whereupon the rate of filtration becomes exceedingly slow. Application of pressure does not help the situation as it merely results in a packing of the filter cake whereupon it becomes more and more dense thus still further reducing the rate of passage of liquid. Even if the material is finally filtered, the same problem comes up when one attempts to wash the precipitate to remove soluble impurities. Here again the fine particles obstruct the flow of liquid. Then, when after with great difficulty the precipitate is successfully filtered and washed another problem presents itself. That is, when the precipitate is dried it tends to form a hard, horny mass which is difficult to dissolve and difficult to grind.

It is evident that the problems of filtration and washing can be alleviated to a great extent by addition of a filter aid such as a diatomaceous earth. However, in such case the protein will be contaminated with the filter aid rendering it unacceptable for food or feed purposes.

We have now found that the disadvantages outlined above may be obviated by occluding the precipitated protein material in a precipitate of a calcium-precipitable pectous material. Thus in carrying out our process, we dissolve a calcium-precipitable pectous material in the suspension of precipitated protein material. Then we add either a polyvalent metal salt or sufficient acid to precipitate the pectous material. The pectous material forms a gel precipitate which is very voluminous and which occludes or enmeshes the fine particles of protein forming a massive precipitate of such large particle size that it can simply be strained to separate it from the liquid. For washing, the precipitate can be agitated in a body of water then the water strained off, these processes being repeated as often as necessary. Finally the precipitate is pressed in a cloth to make a dry cake (about 30% solids) and then dried in air. Not only is separation from the original liquid easy and rapid but the washing is easy and rapid. Further, when the pressed cake is dried it forms a crumbly, light-colored product which can be readily redissolved if desired. The drying is simplified too because the pressed mass is of a porous, light texture and does not shrink to a horny mass as does the precipitate produced by known procedures. It is evident that the protein produced by our method will contain the pectous material. This however is no disadvantage as the pectous material is not toxic hence the product is suitable for use in foods and feeds. It is of course well known that pectous materials are present in virtually all fruits and vegetables and may have some food value in the case of ruminants, for example.

Although this invention can be applied to the isolation of any proteinous material, it is particularly adapted to isolating those proteins which precipitate as finely divided materials thus forming suspensions which can be filtered only with great difficulty. Prime examples of such types of proteins are those present in peas and hence one object of this invention is particularly directed to the isolation of proteins from peas. By utilizing our technique the pea protein is isolated simply without the use of expensive reagents or equipment. The pea protein product is high in nutritional value and is thus eminently useful as an animal feed or feed supplement. By use of our invention the pea protein is obtained as a crumbly, light-colored product which can readily be mixed with other feeds being friable and free-flowing when ground. In isolating pea protein, the peas are soaked in water, the pea-water mass is then ground and strained. By this straining procedure the fibrous material and the starch are retained on the screen and the liquid phase contains essentially all the protein. The pea protein is precipitable by adjustment of the pH of the solution to 5 or less, usually a pH of about 4.5 is used. Further details with regard to isolation of pea proteins is shown in the examples hereinafter.

In general, our novel isolation process is preferably carried out as follows:

(1) The proteinous material is first precipitated. The method by which this is done is immaterial and one can use any of the precipitation techniques known in the art as outlined hereinabove.

(2) To the suspension of the precipitated proteinous material is then added a calcium-precipitable pectous material, this material being dissolved in the liquid phase of the suspension. By the term "calcium-precipitable pectous material" we mean the partly or completely de-methoxylated derivatives of pectin, that is, pectic acid, the soluble salts thereof, low-methoxyl pectinic acids, and the soluble salts thereof, these materials all being precipitable by calcium ions. Such materials are prepared by subjecting pectin or pectin-source materials to demethoxylation using an acid-, alkaline-, or enzyme-catalyzed reaction. Pectic acid is a completely de-methoxylated pectin, that is, the pectin nucleus is retained but the carbomethoxy groups (—COOCH₃) have all been de-esterified to carboxyl groups (—COOH). The methoxyl content of pectic acid is therefore substantially zero. In preparing low-methoxyl pectinic acids, the de-methoxylation is not carried so far hence the products still contain some carbomethoxy groups in addition to carboxyl groups. In general we can employ in our process any of the low-methoxyl pectinic acids having a methoxyl content up to about 7%. Therefore, in summation, we use pectous substances having a methoxyl content from zero percent to about 7%. The pectous materials are insoluble or at most weakly soluble when in their acid (unsalified) form, however, they can be used in such form if the protein solution is basic as under such circumstances they form soluble salts in the solution. Usually, to avoid any possibility of insolubility, we prefer to employ the pectous materials in their completely or at least partly neutralized (salified) form. Usually these materials are best employed in the form of their completely or partially neutralized form with alkali metals or ammonium. The amount of pectous material required in any particular case will depend on many factors as for example the chemical and physical properties of the particular protein, the degree of fineness of the protein particles and so forth. In general, we have found that the proportion of pectous material may be in the range from about 0.1 to about 1 part of pectous material per part of protein.

In many cases, for example, where the protein product is to be used as a feed or as a feed supplement, the calcium precipitable pectous material need not be in a purified or isolated state. Instead, one can use plant substances which contain these materials. Thus, for instance, citrus peel, or similar pectin-containing plant substances, can be subjected to acid, alkaline, or enzymic treatment to partially or completely de-methoxylate the pectin in situ. The formed pectous material is not isolated from the peel but the peel is simply dried directly or after neutralization with an alkali metal or ammonium hydroxide, carbonate, or bicarbonate. Since the peel contains the desired pectous material in situ, it can be used in our process as the source of the pectous material. The fact that such substances will add cellulosic materials to the protein is of course no detriment where the final product is intended as an animal feed, particularly for animals which can digest cellulose. Methods of producing calcium-precipitable pectous materials in situ in citrus peel are disclosed in the U. S. Patent to Owens and Maclay, No. 2,444,266.

(3) To the protein suspension containing the dissolved calcium-precipitable pectous material we then add the pectous material precipitating agent, that is, either (a) the polyvalent metal salt or (b) the acid.

(a) In the event that the pectous material is precipitated as its polyvalent metal salt, one can use many polyvalent metal salts as the precipitating agent. Usually we use a calcium salt particularly because calcium salts are relatively inexpensive and are non-toxic, thus we may use, for example, calcium acetate, calcium chloride, calcium nitrate or any other soluble calcium salt. Instead of a calcium salt one can use any salt which is capable of forming a water-insoluble composition with the pectous material. Thus one may use any soluble salt of aluminum, copper, iron, nickel, cobalt, lead, mercury, magnesium, and so forth. Naturally if the product is to be used as a food or feed, the use of toxic metals should be avoided. The amount of the polyvalent metal salt will in any case depend upon the amount of pectous material. Usually it is simplest to simply employ a stoichiometric amount of the polyvalent metal salt as required to form the polyvalent metal salt with the pectous material. However, since the pectous materials will precipitate even if they are only partly salified with the polyvalent metal ion, one can employ a smaller proportion of the polyvalent metal salt, i. e., down to about one-tenth of the stoichiometrical quantity.

(b) In the event that the pectous material is precipitated in its insoluble acid form, it is only necessary to add sufficient acid to the reaction mixture to reduce the pH to about 2.5 or less, preferably the pH is reduced to about 1.5. For this purpose one may use any acid which is dissociated strongly enough to reduce the pH to such levels. Suitable acids are, for example, sulphuric, hydrochloric, hydrobromic, phosphoric, formic, oxalic, and so forth. Naturally this acid precipitation technique is suitable only if the protein remains insoluble at the low pH required for the pectous material precipitation. If the protein is soluble at the low pH, the metallic salt precipitation method (3a, above) is preferred as it can be carried out at higher pH's.

Since the formation of the pectous material gel precipitate with either a polyvalent metal salt or an acid involves essentially an ionic reaction, the temperature at which our process is conducted is not critical. Usually, for convenience, the process is carried out at room temperature (20°–25° C.) as being most convenient. Naturally, if the particular protein is initially precipitated by application of heat then the reaction will be carried out at whatever temperature is required to cause such precipitation.

(4) After stirring the mixture to ensure complete precipitation of the pectous gel precipitate containing occluded protein the precipitate is separated from the liquid phase. This can be accomplished in a number of ways, for example, the reaction mixture can be filtered through cloth or paper. However, it usually is preferred to strain the mixture through a sieve as the gel particles are so large that they will not pass through an ordinary household strainer. The strained gel can then be re-slurried in water to wash it and strained again. These procedures may be repeated as many times as necessary. Finally the precipitate is placed in a cloth and squeezed by hand or in a press to de-water it to about 30% solids. The de-watered precipitate is then subjected to drying. Usually this is carried out by exposing the material to a current of air preferably heated up to about 100° C. to accelerate evaporation of moisture. Drying under vacuum may be used if desired.

The procedure outlined above in paragraphs 1 to 4 represents the preferred technique in accordance with our invention. However it is not essential to carry out steps 1, 2, and 3 in the stated sequence. Thus, for example, the relative positions of steps 2 and 3 may be reversed and the pectous material added after the pectous material precipitating agent. In such case, it is preferred to add the pectous material as a solution thus to prevent localized gelation of solid pectous particles. Further, if desired, the precipitating agent and pectous material may be added to the protein suspension simultaneously. Another factor is that the point at which the protein is precipitated can be varied. Thus, for instance, the pectous material may be dissolved in the protein solution and the protein may then be precipitated before, after, or simultaneously with the addition of the pectous material precipitating agent. Conversely, the precipitating agent may be dissolved in the protein solution and then the protein may be precipitated before, after, or simultaneously with the addition of the pectous material. In such case the pectous material would preferably be added in solution form thus to prevent localized gelation of pectous particles. In some cases for example where the pectous material and pectous material precipitating agent cause precipitation of the protein by their salting-out properties or their effect on the pH of the solution, these materials may be added in any sequence to the protein to cause simultaneous precipitation of the protein and of the pectous material precipitate. It is evident from the above that only two critical factors are involved in our process: one is that the protein must be precipitated at some stage in the process. The other is that the pectous precipitate must also be formed at some stage in the process. As long as these two precipitates coexist, the pectous material precipitate will occlude the protein precipitate permitting a ready isolation of the product as hereinabove described.

The following examples demonstrate the invention in greater detail. In each of them the pea protein solution was prepared as follows:

One kilogram of wrinkled dry peas was soaked in 8 liters of water for 12 hours. After this period of time the mass was ground in a hammermill and the resulting mass was strained thus to remove the starch and fibrous material. The liquid passing through the strainer had a pH of approximately 6.1 and contained about 1.5% protein as determined by multiplying the nitrogen content (Kjeldahl) by the factor 6.25.

*Example I*

To 1 liter of the pea protein solution was added sufficient sulphuric acid to reduce the pH to 4.5. It was noted that the pea protein was precipitated at this pH (its isoelectric point) as a finely divided material suspended in the liquid. To this suspension was added with stirring 5 grams of sodium pectate (prepared by enzymatic de-methoxylation of pectin). After the pectate had been dispersed in the suspension, an aqueous solution containing 2 grams of calcium chloride was slowly added to the suspension while agitating. The gel-like precipitate of calcium pectate containing occluded protein was strained to separate it from the mass, pressed through cloth to about 25% solids and then dried in vacuum at 60° C. Yield of dried material, 21 grams.

*Example II*

To 1 liter of the pea protein solution was added sufficient sulphuric acid to reduce the pH to 4.5 thus to form the finely divided precipitate of the pea protein. To this suspension was added 5 grams of sodium hydrogen pectinate (methoxyl content, 3.1%). The reaction mixture was heated to boiling, then cooled to room temperature and 2 grams of calcium chloride incorporated therewith. The gel-like precipitate of calcium pectinate containing occluded protein was strained, pressed, and dried in vacuum at 60° C. Yield of dried product, 23 grams.

*Example III*

To 5 liters of pea protein solution was added 30 grams of sodium hydrogen pectinate (methoxyl content, 3.1%). After the pectinate was dispersed in the solution, dilute sulphuric acid was added to lower the pH to 4.5 thus to form the finely divided precipitate of the pea protein. Ten grams of calcium chloride was incorporated in the suspension then the gel-like precipitate of calcium pectinate containing occluded proteins was strained, pressed and dried in air at 70° C. The crumbly, light brown product weighed 111 grams.

*Example IV*

To one liter of pea protein solution was added 5 grams of sodium hydrogen pectinate (methoxyl content, 3.1%). After the pectinate had been dispersed in the solution, 2 grams of calcium chloride was incorporated therein. It was noted that the pH of the reaction mixture was approximately 4.5. The gel-like precipitate of calcium pectinate containing occluded proteins was strained, pressed, and dried in vacuum at 60° C. Yield of dried material, 21 grams.

*Example V*

To 1 liter of the pea protein solution was added 10 grams of sodium hydrogen pectinate (methoxyl content, 3.5%). After the pectinate was dispersed in the solution, sufficient sulphuric acid was added to lower the pH to approximately 1.5. The voluminous, gel-like precipitate of pectinic acid containing occluded pea protein was strained, pressed, and dried in air at 40° C. The crumbly, light-brown product weighed 21 grams.

Having thus described the invention, what is claimed is:

1. A process for isolating pea protein from a solution thereof which comprises acidifying the solution to form a suspension of the pea protein, forming a calcium-pectous material precipitate by the reaction of a calcium-precipitable pectous material with a soluble calcium salt in the suspension, whereby the formed precipitate occludes the suspended protein, and separating the precipitate containing the occluded protein from the liquid phase.

2. A process for isolating pea protein from a solution thereof which comprises acidifying the solution to a pH of about 4.5, whereby to form a suspension of the pea protein, dispersing in said suspension a calcium-precipitable pectous material in the proportion of from about 0.1 to about 1 part of the pectous material per part of protein, and sufficient soluble calcium salt to precipitate said pectous material, whereby the formed precipitate occludes the suspended protein, and separating the calcium-pectous material precipitate containing occluded pea protein from the liquid phase.

3. A process in accordance with claim 2 wherein the pectous material is a pectate.

4. A process in accordance with claim 2 wherein the pectous material is a low-methoxyl pectinate.

ROLLAND M. McCREADY.
VERNON G. SILVEIRA.

REFERENCES CITED

The following references are of record in the file of this patent:

UNITED STATES PATENTS

| Number | Name | Date |
|---|---|---|
| 2,161,861 | Gerlough | June 13, 1939 |

OTHER REFERENCES

Csonka et al.: J. Amer. Chem. Soc., vol. 48, pp. 763–768 (1926).